United States Patent [19]

Dornier, Jr., deceased et al.

[11] Patent Number: 5,096,140

[45] Date of Patent: Mar. 17, 1992

[54] AIRCRAFT WITH ENGINE PODS TILTABLE ABOUT A TRANSVERSE AXIS

[76] Inventors: Claudius Dornier, Jr., deceased, late of Hochstadt; by Martine Dornier-Tiefenthaler, legal representative, Viehrutenweg 3, D-8031 Hochstadt; Florian Windischbauer, Bäuerlinshalde 1, D-8990 Lindau, all of Fed. Rep. of Germany

[21] Appl. No.: 578,037

[22] Filed: Sep. 5, 1990

[30] Foreign Application Priority Data

Sep. 8, 1989 [DE] Fed. Rep. of Germany ....... 3929886

[51] Int. Cl.⁵ .............................................. B64C 27/28
[52] U.S. Cl. .................................. 244/7 C; 244/12.4; 244/56
[58] Field of Search ............... 244/7 R, 7 C, 56, 66, 244/12.4

[56] References Cited

U.S. PATENT DOCUMENTS

| | | | |
|---|---|---|---|
| 1,867,963 | 7/1932 | Blahnik | 244/7 C |
| 1,951,817 | 3/1934 | Blount | 244/7 R |
| 2,621,001 | 12/1952 | Roman | 244/7 C |
| 2,702,168 | 2/1955 | Platt | 244/7 R |
| 2,961,189 | 11/1960 | Doak | 244/7 R |
| 3,039,719 | 6/1962 | Platt | 244/7 C |
| 3,107,882 | 10/1963 | Matteson et al. | 244/7 C |
| 3,666,209 | 5/1972 | Taylor | 244/7 C |

FOREIGN PATENT DOCUMENTS

| | | | |
|---|---|---|---|
| 1322169 | 7/1973 | United Kingdom | 244/7 R |
| 1088231 | 11/1967 | United Kingdom | 244/7 R |

Primary Examiner—Joseph F. Peters, Jr.
Assistant Examiner—Carla Mattix

[57] ABSTRACT

The invention concerns an aircraft with engine pods located outboard on the wings and tiltable about a transverse axis. A fixed wing centerpiece is provided which terminates at the outside in each spanwise direction in a separation location. A through tubular spar is rotatably supported in the wing centerpiece. This tubular spar serves as a support for the outer wings which continue beyond the separation locations and which, together with the engine pods located there, form a unit which can be jointly swivelled or tilted.

10 Claims, 5 Drawing Sheets

* SIMILAR = SAME ADJUSTMENT OF LEFT-HAND RIGHT-HAND PROPELLERS

* DISSIMILAR = LEFT-HAND AND RIGHT-HAND DIFFERENT

** OPTION FOR YAW CONTROL INSTEAD OF AILERON ACTUATION

FIG. 6

AIRCRAFT WITH ENGINE PODS TILTABLE ABOUT A TRANSVERSE AXIS

BACKGROUND OF THE INVENTION

1. Field of the Invention

The invention concerns an aircraft with engine pods located outboard on the wings and tiltable about a transverse axis.

2. Prior Art

In the case of V/STOL aircraft with propeller propulsion, two configuration possibilities have, essentially, become known, i.e. tilting wing and tilting pod aircraft.

In tilting wing aircraft, the wing, on which the propeller engines are located, is rotated in total into a vertical position when taking off and landing so that the downward directed propeller jet acts as an upward thrust so that it can lift the aircraft weight. The fuselage axis and the wing section axis then form an approximate right angle.

When changing from hovering flight to cruise flight (the so-called transition), the wings are gradually swivelled from the vertical position to the normal horizontal position; vice versa during landing. It is evident that during transition, the wings cause a strong downwind over the whole span due to the very large angles of incidence and this downwind can affect the elevators. In this case, the elevators are subjected to a downward airflow which would again lead to a perturbation of the moment balance about the y (pitch) axis. In order to avoid this undesirable effect, the tailplanes or the front tandem wings are swivelled along with the wings in the previously known tilting wing aircraft, i.e. in the types LTV XC-142a, Canadair CL 84, the VFW project VC 400 and the Bolkow project BO 140. Even if the swivel angle of the tailplane can then be less than that of the wing, such a swivelling device which, furthermore, has to operate exactly synchronously with the swivelling of the wings, involves a substantial extra amount of weight and complexity.

Another example of a tilting wing aircraft is described in DE-PS 1,241,270. In this case, the wings are tilted over their whole span width for vertical take-off or hover. For this flight condition, a special jet nozzle unit is provided in the aircraft tail so that pitch control can be carried out when there is no or only a little forward speed. Because, due to the ground effect, the ailerons located on the trailing edge of the wings are not fully effective for yaw control about the aircraft vertical axis, the patent specification quoted proposes that the whole of the outer ends of the wings should be designed as lateral control surfaces located essentially completely within the air jet generated by the propeller propulsion.

Another disadvantage of the tilting wing configuration is the fact that during transition, the swivelling mechanism must accept all the loads from the propulsion system (inertia/gyroscropic torques, torques from propeller thrust) and due to the wings. Because the wings can build up substantial aerodynamic forces during transition and because load factors have to be taken into account, the swivelling mechanism must have correspondingly large dimensions and this costs space and weight.

A tilting wing aircraft does, in fact, usually provide usable cruise performance and it also offers a low frontal area during vertical take-off and landing. In addition, it can also be used for horizontal take-off and landing if required. On the other hand, however, these advantages are outweighed by the disadvantages mentioned above with respect to the complicated swivelling system and controls for the tailplane, which usually result in poor hovering flight properties.

In the tilting pod configuration similar to the known Bell XV-3 and XV-15 types, it is not the wing but only the propeller or rotor pod which is swivelled into the vertical position about the fixed wing. Another example of swivellable or tiltable rotors is described in DE-PS 2,032,259. In that case, the engine rotors are arranged to be tiltable at the end of fixed wings and are driven by engines provided in the aircraft tail. The rotors are designed in the manner of helicopters and can, by swivelling or tilting, be brought from helicopter operation with vertical take-off and vertical landing into propeller operation for cruise flight and vice versa. The rotors must then have full cyclic control with flapping hinges, etc. Special means are provided in order to provide the rotors, as required, with more or less of the properties of a rigid or a non-rigid rotor.

Although this avoids the disadvantages mentioned above of the tilting wing configuration with respect to detrimental tailplane effects and the complicated swivelling mechanism, other disadvantages appear—a major proportion of the fixed wing is subjected to the propeller jet in hover, i.e. the jet area loading (aircraft weight/propeller (rotor) area) must be reduced to an amount tolerable for hovering flight. It has been found in practice that the jet area loading leads into the range of magnitude usual for helicopters and this is in turn associated with the necessity for large rotors and the problems which then arise - high weight, design limitations (large rotor diameter), aeroelastic loading, gust sensitivity in particular and poor cruise flight performance because the rotor is too large. The shape of the wing is then orientated towards the propeller diameter and is not optimum for cruise flight. In addition, there is a high bearing load at the ends of the wings during rotor swivelling and this has to be accepted by relatively small trunnions located there. In addition, a normal landing with unswivelled pods is not possible in an emergency and the large rotors demand a complex design of the rotor head, similar to that for helicopters with full cyclic pitch control.

SUMMARY OF THE INVENTION

The object of the invention was to avoid the disadvantages described above with respect to tilting wing and tilting pod configurations. In particular, the mechanical complexity of tilting wings should be reduced as much as possible and better hovering flight properties should be achieved. On the other hand, both the detrimental action on large parts of the fixed wing during hovering flight and the high bearing loads of tilting pod configurations should be avoided. Finally, the complicated rotor head control of the tilting pod configuration should be simplified. A further part of the object of the invention is to make it possible to carry out vertical or horizontal take-off and landing as options where required.

Because of the subdivision according to the invention of the wing into a fixed wing centerpiece and tiltable outer wings continuing from it, action by the engine jet on the wing located transverse to it is substantially reduced and a favorable high jet area loading and simplification of the rotor control is achieved by the design of the engine pods as a unit with the outer wings and by their common tilting or swivelling. Because the outer wings, together with the engines, are located on a through tubular spar which is rotatably supported in the wing centerpiece and which acts as a support, the bearing loads at the end of the wing centerpiece are substantially reduced. The control of the rotors in the engine pods also becomes simpler because complete helicopter rotor head control is unnecessary. It does not matter to the basic concept of the invention whether adjustable propellers or rotary wing rotors, known per se, are involved. In the region of the engine jet, e.g. of the propeller jet, good jet guidance for hovering flight takes place because the outer wings swivel along with the engines. High jet area loading implies a smaller propeller diameter. The radius of the rotor disk can then be smaller than the distance between the engine axis and the ground when the outer wing is not tilted. This makes horizontal take-off or landing, in addition to vertical take-off, possible as options.

The combination according to the invention of a tiltable engine pod and a tiltable outer wing to form one unit involves a higher bending moment at the wing separation location, where the swivelling takes place, between the centerpiece and the outer wings, compared with a design of a swivelling pod without outer wing. The use of a through tubular spar deals with this increased load and permits the swivelling device to be kept simple. Instead of the short, highly loaded trunnions at the separation location, the through tubular spar accepts torsional and bending moments without causing excessive bearing forces in the fixed wing centerpiece. In this way, it is sufficient to provide only one swivelling device, for example in the aircraft fuselage, for rotating the tubular spar, i.e. for tilting the entire engine pods and outer wings. This substantially reduces the complication relative to the previously known tilting arrangements.

Because, as already mentioned, the tubular spar extends within the torsion box of the wing centerpiece, it is necessary to support the tubular spar at some bearing points. This is preferably carried out at two points in the fuselage (transverse forces accepted in the outer skin of the fuselage) and by means of a bearing at each of the separation locations between the wing centerpiece and the outer wings. In order to ensure minimum bearing forces, the bending line of the tubular spar can be matched as far as possible to the bending line of the wing centerpiece. This matching can take place very simply by appropriately designing the cross-section of the tubular spar.

In order to improve and simplify the yaw control in hover (rotational motion about the z axis), it is proposed that the tiltable outer wings be equipped with ailerons. The ailerons can then be used for yaw control during hover. In accordance with a further advantageous embodiment of the invention, the outer wings can be subdivided in the spanwise direction beyond the engines, a wing tip section supported so as to be individually rotatable in each outer wing being arranged as outer termination of the tiltable outer wings. These wing tip sections can be employed for yaw control in the same manner as the ailerons.

For pitch control in hover, provision is made for the angle of incidence of the propeller blades on the left-hand and right-hand sides of the aircraft to be modified simultaneously and in the same sense in such a way that, for example, the blade moving forward in the horizontal propeller disk receives more angle of incidence and the blade moving backward receives less angle of incidence, i.e. the adjustment by $\pm \Delta \alpha$ takes place symmetrically to the y axis. Such an adjustment, in which the blade adjustment device experiences an inclination about the y axis or about an axis parallel to it, is referred to as "monocyclic" blade control and has the advantage that a horizontal tail rotor or a special control jet nozzle in the tail becomes unnecessary. The monocyclic blade control accordingly differs from the full cyclic blade control used in helicopters and derived from a swash plate which can be inclined in all directions. Such a blade control system involves substantial extra complication and dealing with it mechanically produces problems due to the many hinges in the rotor and the control equipment.

The monocyclic adjustment of the propeller blades can also be used, instead of the ailerons mentioned above, to carry out yaw control of the aircraft in hover. For this purpose, the blade adjustment devices are inclined in opposite senses in the left-hand and right-hand propellers. The thrust vectors then produced by the two engines have opposite inclinations with the result that there is a yaw motion about the z axis.

Roll control in hover can, with the configuration proposed, be easily undertaken by different collective blade adjustment on the left-hand and right-hand sides. All the rotor blades on one particular side of the aircraft are then given more or less incidence at the same time, in a similar manner to known propellers with blade adjustment.

The landing flaps arranged in conventional manner on the wing centerpiece can be deflected over the largest possible angular range for hover and vertical take-off. On the one hand, this reduces the area of the wing centerpiece subjected to the engine jets and, on the other hand, it gives better flow around the wing centerpiece.

BRIEF DESCRIPTION OF THE DRAWINGS

An exemplary embodiment of the invention is explained below with reference to the drawing, in which:

FIG. 2b shows a side view of FIG. 2a

DESCRIPTION OF THE PREFERRED EMBODIMENTS

Figure 1A:
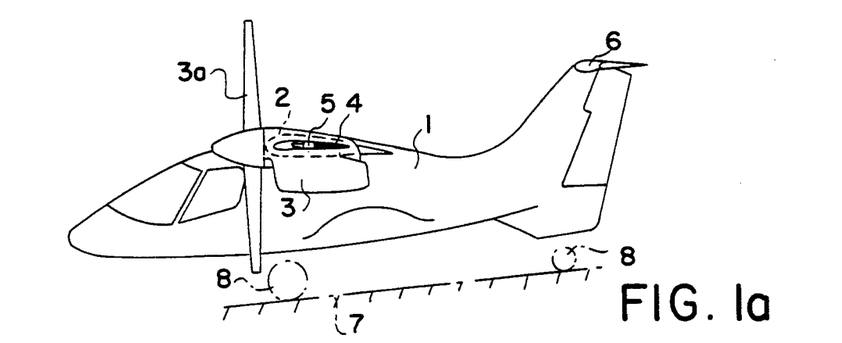
FIGS. 1a, 1b and 1c show the three side views of an aircraft
Figure 1B:
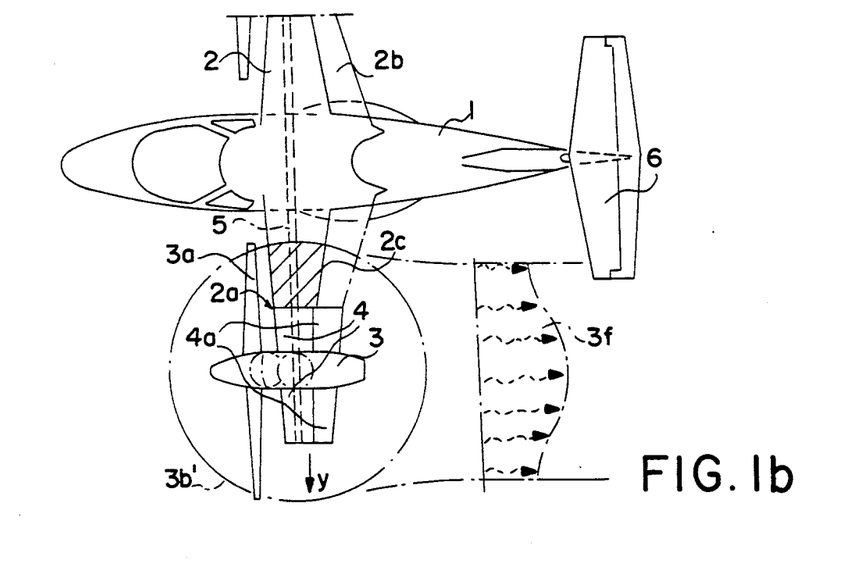
Figure 1C:
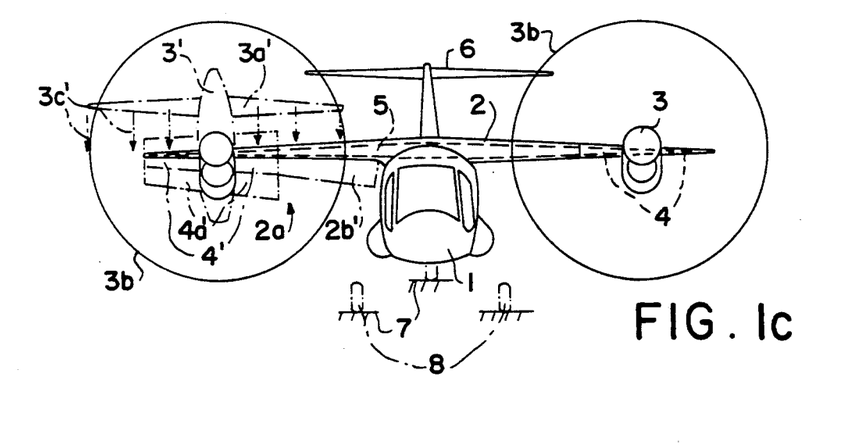

FIGS. 1a, 1b and 1c are first used to describe the general construction of an aircraft according to the invention. Components which can be tilted or swivelled into different positions for vertical flight and horizontal flight are basically given the same reference signs but are provided with a prime in their position for vertical flight. The aircraft fuselage is designated by 1. There is a fixed wing centerpiece 2 mounted on it, preferably in high wing arrangement. The wing centerpiece 2 is terminated at its outboard ends by separation locations 2a, from which continue outer wings 4 beyond the separation locations. These outer wings 4 form a unit with an engine pod 3 located there and can be swivelled or tilted in common with the latter. The engine pod 3 is assigned a propeller or rotor 3a. The propeller disk is indicated by 3b and its arrangement for forward flight can be easily seen. For vertical flight or hover, FIG. 1b shows the propeller disk 3b' chain-dotted for the rotor in its swivelled position. Located parallel to the transverse axis y of the aircraft is a tubular spar 5 in the spanwise direction which is rotatably supported in the fuselage 1 and in the wing centerpiece 2 and which acts as a support for the outer wings 4 and for the engine pods 3 located there and forming a unit with the outer wings. The arrangement is such that the two outer wings 4 with their engine pods 3 can be jointly swivelled synchronously from the horizontal position into the vertical position and vice versa by swivelling the tubular spar 5. In addition, the aircraft has a tailplane 6 which is designed here in the illustrative example as a T-tailplane and undertakes aircraft control in horizontal cruise flight. The arrangement is such that the tailplane is not affected by the propeller jets 3f of the propulsion pods when they are swivelled for vertical flight and the transition phase. Also shown dotted are wheels of an undercarriage 8, which stand on the ground 7.

Landing flaps 2b, which can be deflected downwards as far as possible for hover are provided in conventional manner on the wing centerpiece 2. The deflected position of the landing flaps is shown chain-dotted in FIG. 1c on the left-hand part of the figure and is provided with the reference symbol 2b, The trailing edge 2c of the fixed wing centerpiece 2 can be clearly recognized in FIG. 1b for the deflected position of the landing flap. The left-hand part of FIG. 1c also shows, chain-dotted, the unit formed by the outer wing 4 and the engine pod 3 in the swivelled positions 3' and 4' for hover. The propeller jets of the swivelled propeller 3a' are indicated by 3c' and are directed downwards towards the ground in hover. They experience good flow conditions due to the swivelled outer wing 4'. Only part of these propeller jets 3c' meets the fixed part of the central wing 2, the detrimental surface being minimized, however, because of the engine arrangement and the swivelled components. As may be seen from FIG. 1b, this detrimental surface includes only the shaded part of the wing centerpiece 2.

Ailerons 4a are provided, in conventional manner, on the outer wings 4 and these are effective in the conventional manner in cruise. In hover, on the other hand, the ailerons can be used to generate a yaw motion, i.e. a rotational motion about the z (vertical) axis.

Figure 2A:
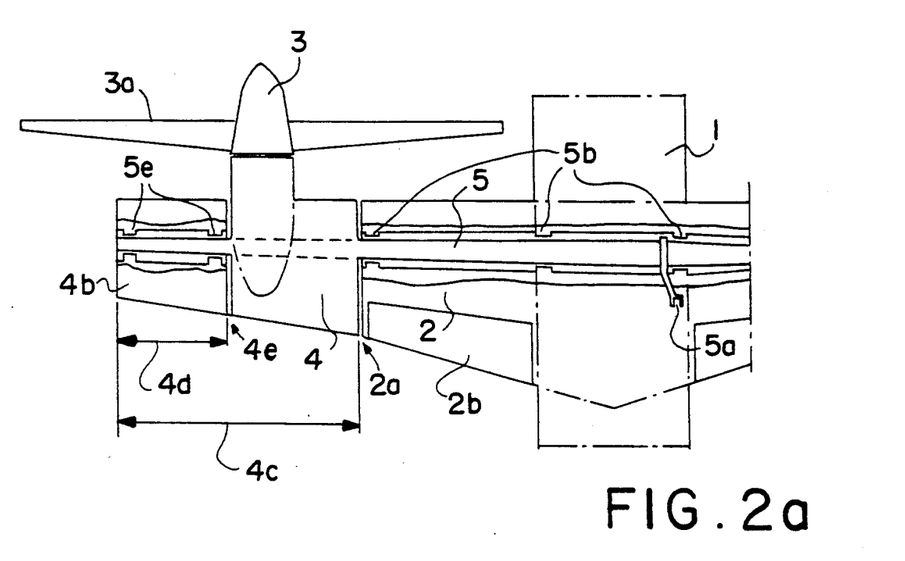
FIG. 2a shows a modification of FIG. 1b
Figure 2B:
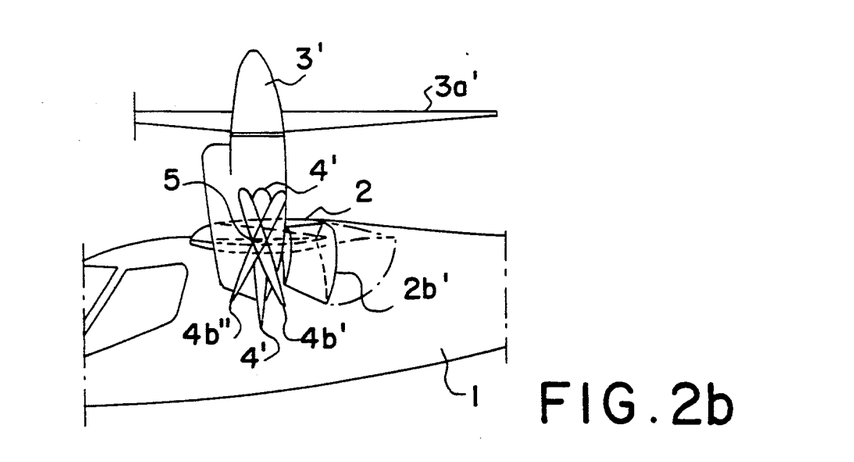

The through tubular spar 5 is now considered in more detail. As is shown by FIGS. 1b and 2a, the tubular spar 5 traverses the whole of the wing centerpiece 2 from one side of the aircraft to the other side of the aircraft and carries, at each of its ends, an outer wing with the propulsion pod. The tubular spar 5 is rotatably supported at those positions where it penetrates the fuselage 1 and at the ends of the wing centerpiece 2, i.e. at the separation locations 2a, in bearings 5b. A drive device 5a is provided in the fuselage to apply torsion to the tubular spar. In this embodiment of the tubular spar 5, synchronous swivelling or tilting of the outer wings 4 with their propulsion pods 3 is ensured. In order better to emphasize the arrangement in the drawing of the tubular spar 5, it—together with the outer wing firmly associated with it and the propulsion installation 3—is shaded in FIG. 2a. The arrangement of FIG. 2a also contains a further modification to the embodiment of the outer wing 4; this is specially considered further below. According to FIG. 2a, the outer wing 4 has a total length 4c. At a distance 4d from the end of the outer wing 4 beyond the engine pod 3, a separation location 4e is provided by means of which a wing tip section 4b is separated from the main outer wing 4. The wing tip section 4b is rotatably supported relative to the actual outer wing 4, e.g. in bearings 5e on an extension of the tubular spar 5. For vertical take-off or hover, the complete outer wing 4, including the wing tip section 4b, is swivelled in the manner already described above so that the propeller jets flowing around the outer wing are guided downwards to the ground. In this position, the wing tip section 4b can now be swivelled independent of the outer wing 4 in a manner similar to the ailerons mentioned above. The wing tip section 4b is therefore used for carrying out yaw control motions. These relationships are shown diagrammatically for however in FIG. 2b. For simplicity, only the essential parts of the arrangement are shown here. The engine pod 3' with its propeller 3a' swivelled for vertical flight can be seen. The fixed wing centerpiece 2 is shown in cross-section. The landing flaps 2b' arranged on the trailing edge of the wing centerpiece are fully deflected downwards, e.g. by 90. Also shown in its position for hover is the outer wing 4' forming a unit with the propulsion rod. Finally, the wing tip section is shown in two different positions 4b' and 4b''. If the wing tip sections 4b are swivelled in opposite senses on the two sides of the aircraft, it is possible to carry out yaw motions in hover in a manner similar to that with ailerons.

In addition it should also be noted that in FIGS. 1b and 2a, the engine pods 3 can be located at a greater or lesser distance beyond the separation location 2a to the wing centerpiece in the spanwise direction of the outer wing 4, depending on the requirements.

Figure 3:
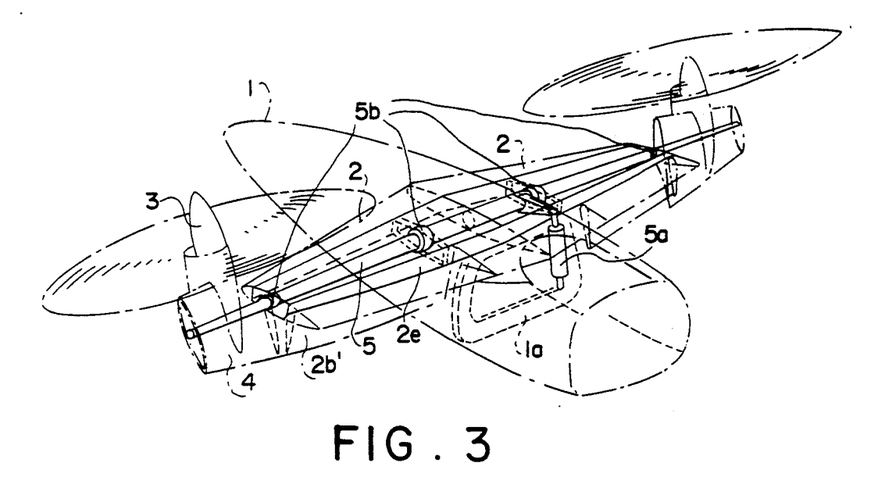
FIG. 3 shows a simplified perspective view of a wing centerpiece

The arrangement of the tubular spar 5 in the wing centerpiece and the fuselage is again shown in a perspective view in FIG. 3. The aircraft fuselage 1 and the wing centerpiece 2 are indicated by chain-dotted lines only. The arrangement of a torsion box with a front and rear spar 2e is indicated within the wing centerpiece 2 by shading. Bearings for the rotation of the tubular spar 5 are provided at the two penetration locations of the tubular spar through the fuselage 1 and at the separation locations at both ends of the wing centerpiece 2b. These bearings are indicated by 5b. A drive device 5a is again indicated for rotating the tubular spar 5 and is, for example, hinged to a frame 1a of the fuselage.

Figure 4:
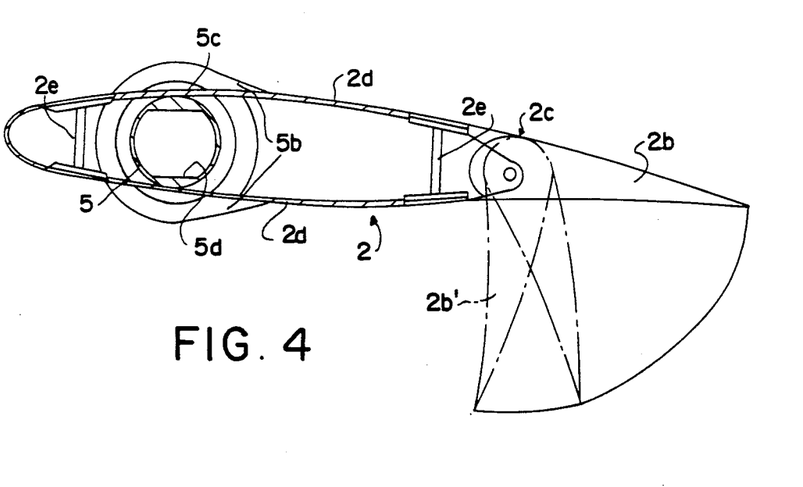
FIG. 4 shows a cross-section through a wing centerpiece

FIG. 4 shows a cross-section through the wing centerpiece. The front and rear spars 2e and the upper and lower skin shells 2d can be seen. These form a torsion box and provide the wing centerpiece with the necessary stiffness. The actual wing trailing edge is indicated by 2c and this is followed by the landing flap 2b. The landing flap 2b is shown in three different positions—in full lines for cruise flight and in chain-dotted lines for hovering. The maximum deflection angle is indicated by 2b' and is approximately 90°. Located within the torsion box is the tubular spar 5 which is supported by means of rolling contact bearings 5c at the bearing positions 5b in the torsion box. In order to match the bending line of the tubular spar 5 to the bending line of the torsion box formed by the spars 2e and the skin shells 2d, the cross-section of the tubular spar is thickened at certain locations, e.g. at the top and at the bottom. Such a thickening is shown by shading and is indicated by 5d. By this means, the tubular spar 5 carries part of the bending load of the wing centerpiece 2 so that the advantages mentioned above arise and the wing itself can, under certain circumstances, be made lighter.

Figure 5A:
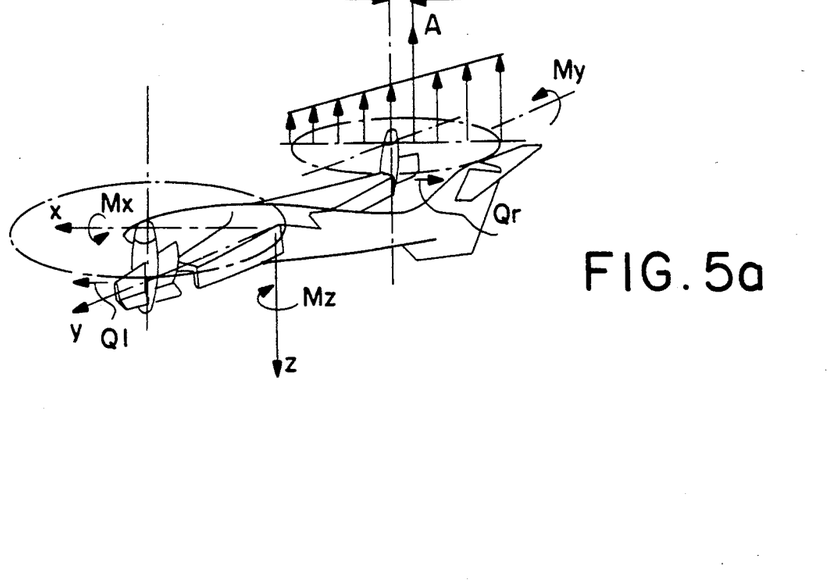
FIGS. 5a, 5b and 5c show, diagrammatically, the essential control measures and the flight motions resulting therefrom
Figure 5B:
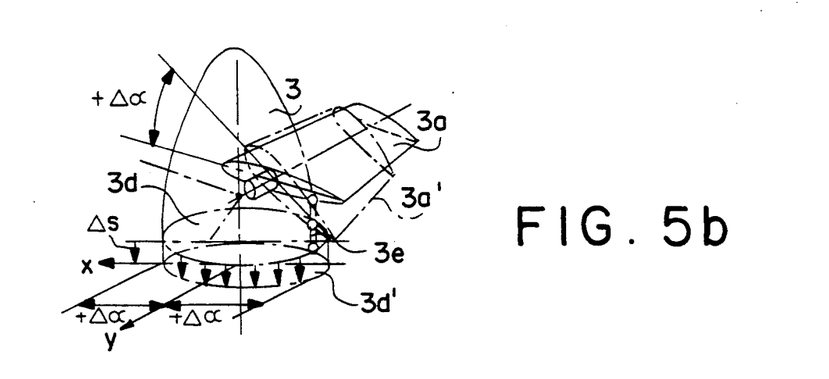
Figure 5C:
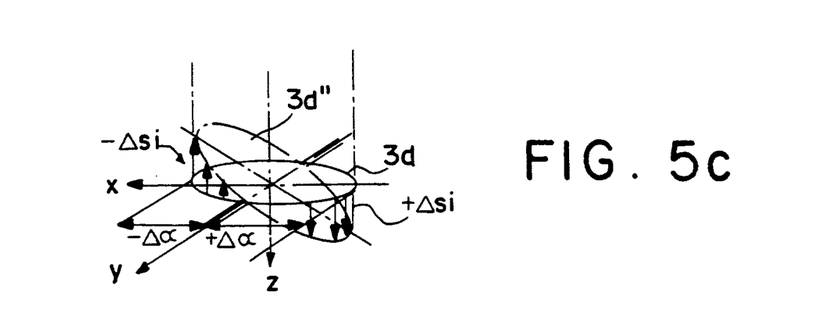

The various control measures are now considered using FIGS. 5a to 5c. FIG. 5a shows, diagrammatically, an aircraft whose wings are swivelled with the engine pods for vertical flight. The x (roll) axis, the y (pitch) axis and the z (yaw) axis of the aircraft are also shown. By opposite deflection of the ailerons on the outer wings, aerodynamic forces $Q_l$ and $Q_r$ are obtained, for example, on the left and right outer wings respectively, as shown in FIG. 5a. These two aerodynamic forces cause a yaw moment $M_z$ about the z axis.

FIG. 5b shows, diagrammatically, the propeller hub of an engine 3, one rotor blade 3a thereof being also shown. The rotor blade 3a is connected, in a manner not shown in any more detail (e.g. by a connecting rod 3e), to a blade adjustment device 3d, e.g. of the swash plate type. If the position of the adjustment device 3d, i.e. a swash plate for example, is displaced uniformly into a new parallel position 3d', all the rotor blades are displaced, by means of the associated adjustment connecting rods 3e, by the dimension $\Delta$ s at their connecting rod hinge positions. By this means, a uniform change in the blade angle of incidence by the amount $+\Delta\alpha$ is achieved for all the rotor blades. This so-called collective blade adjustment is known per se and does not require more detailed explanation. This causes a uniform change of thrust on both engines.

In FIG. 5c, it is assumed that the adjustment device 3d is not displaced in a parallel manner but is inclined about an axis parallel to the y axis. By this means, the blades are adjusted by a value $+\Delta$ si or $-\Delta$ si by the connecting rod 3e when the rotor blades rotate, depending on whether they are in front of or behind the axis of inclination. In consequence, the blades located towards the rear have an angle of incidence change of $+\Delta\alpha$ and the blades located towards the front have an angle of incidence change of $-\Delta\alpha$ which leads to an asymmetrical lift distribution over the propeller disk. Such an asymmetrical lift distribution is indicated in FIG. 5a by arrows above the propeller disk area. The lift component A acts eccentrically on the propeller disk and causes a pitch moment $M_y$. This type of control is here referred to as monocyclic adjustment.

Devices and components which are known per se are employed for carrying out the control measures so that a more detailed description of these components is unnecessary. The mode of operation is known to the specialist and he can obviously use these devices as required.

Figure 6:
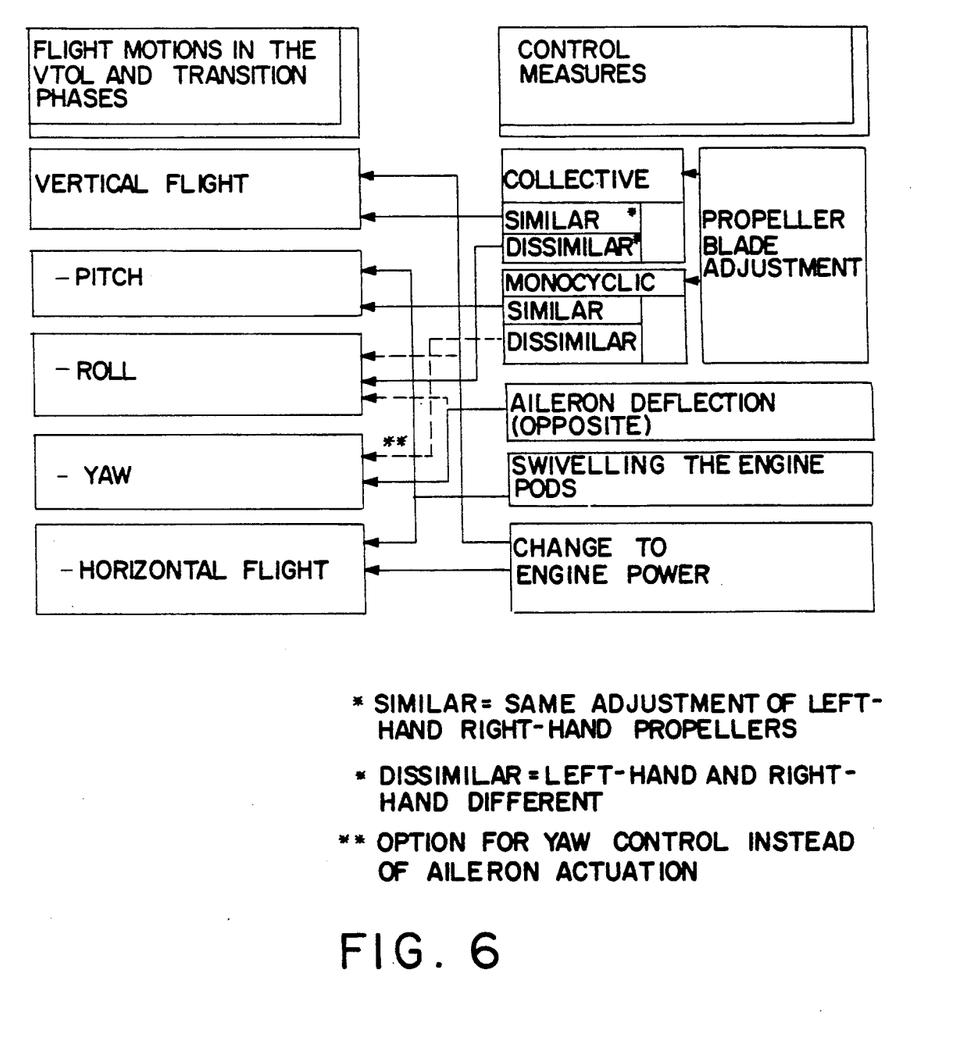
FIG. 6 shows a block circuit diagram for the relationships between the control measures and the flight motions.

FIG. 6 shows, in a block circuit diagram, the relationships between the control measures and the flight motions in vertical flight—or hover—or during the transition phase. The mode of operation can be seen directly from the sketch and the specialist will have no difficulty in converting this information into practical use.

To sum up, the following advantageous properties apply to the aircraft embodiment in accordance with the invention:

the reduction in downwind on the wing centerpiece ensures that there is no need to swivel the tailplane during transition minimum swivelling device complication because the loads are substantially less when compared with a tilt wing aircraft and the swivelling mechanism only has to act at one position on the tubular spar action of the propeller jet on a relatively small part of the fixed wing centerpiece minimizes the losses in hover use of rotors or propellers of relatively small diameter permits a higher jet area loading than in the case of helicopters and thus permits good cruise flight performance with low gust sensitivity normal take-offs and landings are possible with the propellers or rotors not swivelled hover control system using simple monocyclid blade adjustment makes the horizontal tail rotor for pitch control unnecessary; yaw control is possible by means of the ailerons or the monocyclic blade adjustment; in consequence, the propeller hub can be designed for favorable weight and cost the wing centerpiece and the tubular spar together accept the bending moments and this has favorable effects on the structural weight; because, due to the V/STOL capability of the aircraft configuration proposed, the wing used can be kept substantially smaller than in the case of a comparable normal aircraft, the wing weight including the tubular spar can—under certain circumstances—be even smaller than that of the normal aircraft the engine pod can be positioned at any given position in the spanwise direction of the outer wing to suit the optimized diameter of the propeller. Various modifications in structure and/or function may be made by one skilled in the art to the disclosed embodiments without departing from the scope of the invention as defined by the claims.

What is claimed is:

1. An aircraft with wings and having engine pods supporting an engine located outboard of the wings and tiltable about a transverse axis comprising:
   fixed wing centerpieces limited in the spanwise direction by separation locations,
   outer wings continuing from the wing centerpieces supporting the engine pods and jointly tiltable with the engine pods,
   a through tubular spar rotatably supported in the wing centerpieces parallel to the transverse axis of the aircraft and supporting the outer wings and the engine pods, and
   a wing tip section location in the spanwise direction beyond the engine pods and arranged as an outer termination of the tiltable outer wings, the wing tip section being individually tiltably supported in the outer wings, wherein an axis of rotation of the wing tip section is co-axial with an axis of the tubular spar.

2. An aircraft as claimed in claim 1, wherein the tubular spar is rotatably supported in a wing centerpiece designed as a stiff box at positions penetrating an outer wall of the aircraft and at the separation locations with the outer wings.

3. An aircraft as claimed in claim 1, wherein a drive device acting at least one point of the tubular spar and causing its rotation is located within the aircraft.

4. An aircraft as claimed in claim 1, wherein the tubular spar is designed in such a way that its bending line substantially matches a bending line of the wing centerpiece.

5. An aircraft as claimed in claim 1, wherein each tiltable outer wing is equipped with an aileron acted upon by jet from the engine.

6. An aircraft as claimed in claim 1 or 2 or 3 or 4 or 5, wherein landing flaps are located on the wing centerpiece.

7. An aircraft as claimed in claim 1 or 2 or 3 or 4 or 5, wherein a radius of a rotor disk, which substantially covers the complete outer wing and parts of the wing centerpiece in a region of the separation location, is smaller than a distance between an engine axis and the ground when the outer wing is not tilted.

8. An aircraft as claimed in claims 2 or 3 or 5 wherein the tubular spar is designed in such a way that its bending line substantially matches a bending line of the wing centerpiece.

9. An aircraft as claimed in claims 2 or 3 or 4 wherein each tiltable outer wing is equipped with an aileron acted upon by jet from the engine.

10. An aircraft as claimed in claim 1 or 2 or 3 or 4 or 5 wherein the engine has adjustable rotor blades with selectable monocyclic control.

* * * * *